Patented May 28, 1929.

1,714,941

UNITED STATES PATENT OFFICE.

WASILY E. BOLDIREFF AND PETER N. KORUKIN, OF NEW YORK, N. Y., ASSIGNORS OF ONE-HALF TO PETER F. NALETKO, OF NEW YORK, N. Y., AND FEODOR M. CHALOFF, OF BROOKLYN, NEW YORK.

METHOD OF FUR DYEING.

No Drawing.   Application filed May 24, 1928.   Serial No. 280,375.

Our invention relates to methods of fur dyeing and has a particular reference to methods of dyeing by means of dry or semi-dry dyes.

The furs are usually dyed in vats or similar appliances by soaking them in dye solutions. These methods are slow and expensive, requiring considerable manual handling of the furs, as after dyeing they must be subjected to special drying processes. It is also difficult to obtain the exact shade desired and to dye the fur uniformly in all its portions. The skin itself also becomes dyed which is often objectionable.

In our practical experience in dyeing furs we discovered that much better and more uniform results can be obtained by using certain grades of dyes or similar coloring matter in a dry and finely powdered state. By rubbing the dry coloring matter mechanically against the fur a desired color or shade is imparted to the latter. We mix the coloring matter with sawdust or similar material in order to separate the particles of the coloring matter and to prevent formation of lumps, also to increase the rubbing action in the process of dyeing. A certain amount of moisture ordinarily contained in the sawdust causes a slight acid reaction, especially when metal salts are used as colored matter, and this reaction tends to fix the colored matter on the bristles of the hair rendering same waterproof. A slight alkali reaction with other kinds of coloring matter produces the same result.

We found that very satisfactory results are obtained with dry powdered colored matter or paints containing lead and zinc salts, with which we obtain different shades, such as gray, silver, buff etc., including deeper reddish and dark shades. We also used successfully a dye known as Leather Blue (ferric ferricyanide, Fe$_4$(Fe(CN)$_6$)$_3$) and other similar paints and dyes.

The fur for dyeing should be properly cleaned and the bristles combed to prevent their kinking during our process. It is then placed in a rotating drum of an ordinary type, such as are used in dyeing plants for drying furs after dyeing. A suitable quantity of a dry powdered coloring matter or dye is then added mixed with an ordinary sawdust. The amount of sawdust in relation to the amount of the coloring matter may vary and under ordinary conditions may be equal to it. The amount of this mixture in relation to the available space in the drum may also vary, depending on the color and on the shade of it desired in the finished product.

The drum with the fur and the coloring mixture is then rotated in an ordinary manner, usually from one to three hours, depending on the depth of the color wanted. We found that by regulating the time of rotation it is possible to control the depth or shade of the color desired, longer rotation causing the fur to receive deeper or darker coloring.

Instead of rotating drum any other suitable method may be employed for agitating the furs in presence of the mixture of coloring matter with a suitable inert matter, preferably of a fibrous structure, like sawdust.

Important advantages of our invention are that the process of dyeing furs becomes very simple and inexpensive, requiring much less time and labor than with ordinary methods of wet dyeing, also that it is possible to accurately control the shade or color of the finished product by controlling the time of such mechanical agitation.

We claim as our invention:

1. A method of dyeing fur, comprising tumbling the fur with a mixture of dry coloring matter and sawdust or the like until the desired color is imparted to the fur.

2. A method of dyeing fur, comprising agitating the fur with a mixture of dry coloring matter and sawdust or the like, and controlling the resultant color by the length of time of such agitation.

3. A method of dyeing fur, comprising treating the fur with a mixture of dry coloring matter and sawdust or the like.

Signed at New York in the county of New York and State of New York, June, 1928.

WASILY E. BOLDIREFF.
PETER N. KORUKIN.